UNITED STATES PATENT OFFICE.

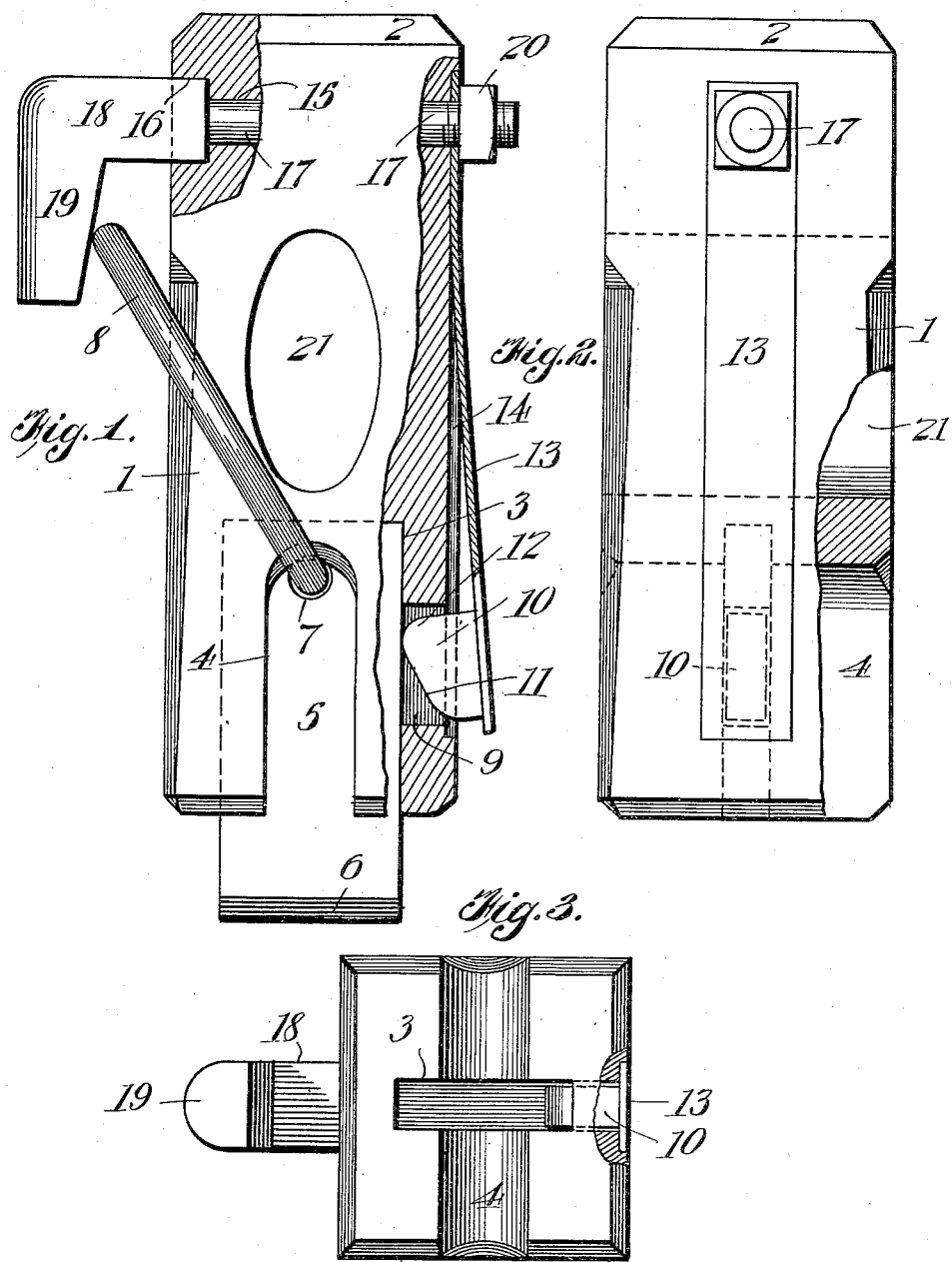

DAVIS S. WUESCHER, OF NEW ORLEANS, LOUISIANA.

TIMBER-DOG DRIVER.

1,163,301.  Specification of Letters Patent.  Patented Dec. 7, 1915.

Application filed May 22, 1915. Serial No. 29,871.

*To all whom it may concern:*

Be it known that I, DAVIS S. WUESCHER, a citizen of the United States, residing at New Orleans, in the parish of Orleans and State of Louisiana, have invented new and useful Improvements in Timber-Dog Drivers, of which the following is a specification.

This invention relates to a timber dog driver or device for use in holding and driving timber dogs into timbers. As is well known, these dogs consist of sharpened spikes which are driven into floating logs and carry rings for the passage of a chain whereby the logs are held to the raft.

In holding a timber dog in position to be driven in by a hammer, the rolling of the log or a disturbance in the water frequently causes the loss of the timber dog, which falls into the water before it can be driven into the log.

The object of the present invention is to provide a device whereby the dog may be held while it is being driven into the log, and whereby it may be driven with ease and facility without liability of becoming loose and falling into the water and thus being lost.

The invention consists in the features of construction and the combination and arrangement of parts more fully hereinafter described, reference being had to the accompanying drawings, in which—

Figure 1 is a side elevation, partially in section, of a timber dog driver embodying my invention, showing the dog held in position for the driving action; Fig. 2 is an end elevation, partially in section, of the same; and Fig. 3 is a bottom plan view of the driver with the dog removed, a portion of the driver being broken away to better disclose a feature of construction.

Referring to the drawing, 1 designates the driver, which comprises an oblong rectangular body or block of metal or other suitable material. This body is provided at its upper end with an anvil surface 2, adapted to receive the blows from a hammer or other driving tool, and at its lower end the body 1 is provided with a socket or recess 3, with which communicate slots 4 in the front and rear faces of the block and opening through the lower end thereof. The socket or recess 3 is adapted to receive the timber dog 5, which comprises a metallic body or block of oblong rectangular form, having at one end a sharpened extremity 6 whereby it is adapted to be driven into the log, and provided at its opposite end with an opening 7 receiving a ring 8, which ring is adapted for the passage of the chain or cable by which the log in which the dog is embedded is held to the raft. The socket 3 is of sufficiently less depth than the dog to permit the sharpened end of the latter to project a desired distance, and it will be evident that the slots 4 are provided to receive and accommodate the sides of the ring 8 and to permit the latter to project beyond one of the lateral faces of the driver so as to be held in position, in a manner hereinafter described.

Formed in one side of the body 1 is an opening 9 which communicates with the adjacent side of the socket 3 and which receives a holding device 10. This holding device, which is designed to frictionally engage the dog 5 and yieldingly hold it seated within the socket against displacement, comprises a substantially flat detent plate having a beveled inner surface 11 terminating in a rounded portion or nose 12 adapted to engage the adjacent side of the dog 5. The detent plate is carried by the lower free end of a plate spring arm 13 which normally lies seated within a recess 14 in the proximate side of the body 1, said spring being fixed at its opposite or upper end and providing sufficient pressure to hold the dog seated against any possibility of accidental displacement.

The upper end of the body 1 is provided with a transverse passage 15 which communicates at one end with the recess 14 and at its opposite end with a countersink or cavity 16 in the opposite lateral face of the block 1. This passage 15 receives a bolt 17 formed upon a retaining member 18 having a jaw 19 arranged at an angle thereto and having an inclined surface 19′ to engage the free end of the ring 8 to hold the ring in position in such a way as to avoid its interference with the driving action in embedding the dog in the log. The retaining member is of angular form and seats within the angular socket 16, whereby it is held from rotation, and the threaded end of the bolt 17 is provided with a nut 20 which holds the retaining member in position and at the same time bears against and fastens the upper end of the spring arm 13 in place, said arm being perforated for the passage of the bolt. The driver is formed with an eye 21 for the reception of a wooden or metallic handle by which the device may be held in position for the driving action.

It will be observed by reference to Fig. 1 that when the socket 3 is empty the detent 10 will be pressed inward by the spring arm 13 until said spring arm lies within the recess 14 flush with the adjacent lateral face of the body 1. The curved or rounded portion 13 of the dog will thus project into the recess 3 and the curved or inclined surface 11 will lie in the path of movement of the dog 5 when the latter is inserted. Hence, in inserting the dog the detent 10 will be pressed outward until the nose or curved bearing surface 12 engages the dog, at which time the spring 13 will be placed under maximum tension and the dog will be fully seated in the socket 3, by which the pressure of the detent on the dog will hold it firmly in position. It will also be evident that the curved nose of the detent will permit the dog to slide outward under a sufficient pull upon the driver 1, owing to the fact that the detent is yieldingly backed by the spring arm 13.

It will be understood that when it is desired to drive the dog 5 into a log or timber the end of the dog carrying the ring 8 is slipped into the socket 3, the ring projecting outward through the slots 4 and being swung upward to the position shown in Fig. 1, so as to be retained at its free extremity by the jaw 19. When inserted, the dog 5 will press back the detent 10, which will frictionally engage it and retain it in position against displacement by its weight or under ordinary shocks or jars, the sharpened end of the dog projecting sufficiently to enable it to be driven to the desired degree into the log. The device may thus be carried without liability of loss or displacement of the dog, and in driving the dog the device is placed in position above the log and the end 6 of the dog brought into contact with the log, the driver being held in one hand by means of the handle inserted in the eye 21 while one or more blows are struck upon the anvil surface 2 by means of a hammer or other suitable tool, whereby the sharpened end of the dog will be driven into the log until the lower end of the driver abuts against the same. This may be done without the ring 8 dropping down and interfering with the driving action, as will readily be understood, and so that after the dog is driven the driver may be released therefrom by simply pulling it away from the dog, the detent 10 riding against the adjacent surface of the dog while the free end of the ring 8 rides against the inclined surface 19' of the jaw out of engagement with said jaw, as will be readily understood.

Hence, it will be apparent that the dog may be held in a secure manner against any possibility of loss or displacement from the rolling of the log or disturbance in the water, so that it may be fully driven, after which the driver may be quickly and conveniently removed therefrom. The inclined face 19' of the jaw 19 forms a flaring space between the same and the adjoining side of the driver which permits of the insertion of the free end of the ring as the dog is being inserted into the socket 3 and its gradual movement toward the driver in the contracted portion of said flaring space, and so that when the driver is removed from the dog by an outward endwise motion the free end of the ring 8 will simply slip out of the flaring space, so that the necessity of relaxing the nut 20 and adjusting the jaw 19 will be obviated.

I claim as my invention:

1. A device for holding and driving a timber dog, comprising a body having an anvil surface and a dog-receiving recess, and having slots intersecting said recess and adapted for the passage of a ring attached to the dog, means for releasably holding the dog in position, and a detent disposed at one side of the body above said recess and slots and having an inclined surface spaced from the body to provide a keeper recess in which the ring may be disposed and held in an elevated position with respect to the dog.

2. A device for use in holding and driving a timber dog comprising a body having an anvil surface and a dog receiving recess, and having slots at opposite sides intersecting said recess, said slots being adapted for the passage of a ring attached to the dog, means for releasably holding the dog in position, and means for releasably retaining the ring in an out-of-the-way position.

3. A device for use in holding and driving timber dogs, comprising a body having an anvil surface and a dog-receiving recess, and provided with slots intersecting said recess for the passage of a ring attached to the dog, a friction detent at one side of the body for releasably holding the dog in position, a spring acting on said detent, a second detent at the opposite side of the body for holding the ring in an out-of-the-way position, and a common fastening means passing through the body for securing the spring and second detent to said body.

4. A device for use in holding and driving a timber dog comprising a body having an anvil surface and a dog-receiving socket, and provided with slots intersecting said socket at opposite sides for the reception and accommodation of a ring attached to the dog, a retaining device to engage and hold the ring of the dog swung upwardly and in a non-interfering position, and a spring-pressed detent to frictionally and releasably engage and hold the dog in position.

5. A device for holding and driving a timber dog comprising a body having an anvil surface at one end thereof, a dog-receiving socket at the other end thereof, an opening intersecting one side of said socket, and slots intersecting diametrically opposite sides of the socket, said slots being adapted for the reception and accommodation of a ring upon the dog, a spring-actuated friction detent movable in said opening, and a retainer at one side of the body provided with an inclined ring-engaging surface, said body having an eye for the insertion of a handle whereby the device may be held during the driving action.

In testimony whereof I affix my signature in presence of two witnesses.

DAVIS S. WUESCHER.

Witnesses:
Miss D. KAUFFMAN,
J. P. BALDWIN.

Copies of this patent may be obtained for five cents each, by addressing the "Commissioner of Patents, Washington, D. C."